United States Patent
Kikuchi

(10) Patent No.: US 8,358,570 B2
(45) Date of Patent: Jan. 22, 2013

(54) METHOD OF DRAWING A PATTERN FOR MAGNETIC TRANSFER

(75) Inventor: Hiroto Kikuchi, Nagano (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 252 days.

(21) Appl. No.: 12/910,181

(22) Filed: Oct. 22, 2010

(65) Prior Publication Data

US 2011/0096640 A1  Apr. 28, 2011

(30) Foreign Application Priority Data

Oct. 22, 2009  (JP) ................. 2009-242964

(51) Int. Cl.
*G11B 9/10* (2006.01)
(52) U.S. Cl. ............... 369/101; 360/75; 250/492.22; 430/296; 430/242
(58) Field of Classification Search ............... 369/126, 369/120, 121, 13.02, 13.01, 13.33, 13.13, 369/13.32, 101; 360/75, 135; 250/492.22, 250/492.23, 492.1, 492.3; 430/296, 942
See application file for complete search history.

(56) References Cited

U.S. PATENT DOCUMENTS

| | | | |
|---|---|---|---|
| 5,668,679 A | 9/1997 | Swearingen et al. | |
| 7,817,377 B2 * | 10/2010 | Okino | 360/135 |
| 7,868,308 B2 * | 1/2011 | Komatsu et al. | 250/492.22 |
| 8,049,190 B2 * | 11/2011 | Komatsu et al. | 250/492.22 |
| 2004/0001415 A1 * | 1/2004 | Formato et al. | 360/75 |
| 2004/0091817 A1 * | 5/2004 | Komatsu et al. | 430/296 |
| 2006/0001993 A1 * | 1/2006 | Usa et al. | 360/15 |
| 2006/0017020 A1 * | 1/2006 | Usa et al. | 250/492.23 |
| 2009/0140162 A1 * | 6/2009 | Komatsu et al. | 250/396 R |
| 2009/0140163 A1 * | 6/2009 | Komatsu et al. | 250/396 R |

FOREIGN PATENT DOCUMENTS

| | | |
|---|---|---|
| JP | 2001-243733 A | 9/2001 |
| JP | 2002-083421 A | 3/2002 |
| JP | 3343343 A | 8/2002 |
| JP | 2006-147139 A | 6/2006 |
| JP | 3999436 A | 8/2007 |

* cited by examiner

*Primary Examiner* — Tan X Dinh
(74) *Attorney, Agent, or Firm* — Rabin & Berdo, P.C.

(57) ABSTRACT

A method of drawing a pattern for magnetic transfer on a substrate, including the steps of rotating the substrate and scanning the substrate, by an electron beam, in a circumferential direction thereof, deflecting, using a deflection signal, the electron beam in a radial direction thereof, and switching irradiation of the electron beam on and off, so as to create the pattern of a plurality of dots.

6 Claims, 11 Drawing Sheets

1 track scanning line
(between dotted lines)

radial direction

2nm circumferential direction scanning line
(between dotted lines)

1 track clash stop 17
clash stop 18
14 voice coil motor
13 actuator arm
200 magnetic recording medium
100 spiral track
12 magnetic head timing signal
101

102
peak position

METHOD OF DRAWING A PATTERN FOR MAGNETIC TRANSFER

CROSS-REFERENCE TO RELATED APPLICATION

This application is based on, and claims priority to, Japanese Patent Applications No. 2009-242964, filed on Oct. 22, 2009, contents of which are incorporated herein by reference.

BACKGROUND OF THE INVENTION

1. Field of the Invention

The present invention relates to a method of drawing a pattern for magnetic transfer by rotating a substrate to be drawn to scan an electron beam in the circumferential direction. The method is favorable in particular for drawing an original pattern of a master disk for magnetic transfer to magnetic recording media to be mounted on hard disk drives (HDDs).

2. Description of the Related Art

Common HDDs conduct read-write of data using a magnetic head flying over a magnetic recording medium (a hard disk) at a height of about 10 nm. The bit information on the magnetic recording medium is stored in concentrically arranged data tracks. The magnetic head is positioned on the data tracks in the data read-write processes. Servo information for positioning the magnetic head is stored on the magnetic recording medium. The servo information is recorded concentrically to the data tracks with a constant angular spacing.

The servo information is generally written by means of a device called a servo writer that records servo signals while positioning the magnetic head by controlling an actuator arm using a push pin.

However, the method of writing the servo information by means of a servo writer has a problem of inaccurate positioning of the servo signals and a problem of increased cost due to fast obsolescence of the servo writer.

In order to cope with these problems, an off-line servo recording technique and a self-servo recording technique have been developed.

The off-line servo recording technique records servo signals using an off-line servo recording device before installing a magnetic recording medium into an HDD. This technique improves accuracy as compared with a servo writing method using a push pin.

The self servo recording technique preliminarily installs a magnetic recording medium that has reference servo signals written therein into an HDD, and then a magnetic head is positioned referring to the reference servo signals in the HDD, thereby final servo signals are written to a plurality of magnetic recording media. Recording quality in this technique is determined depending on the reference servo signals. This technique is effective in a device cost.

The reference servo signals employed in the self servo recording technique include a reference servo signal in a spiral mode as disclosed in U.S. Pat. No. 5,668,679, Japanese Unexamined Patent Application Publication No. 2006-147139, Japanese Unexamined Patent Application Publication No. 2001-243733, for example.

The recording technique of the reference servo signal in the spiral mode will be described with reference to FIG. 11. FIG. 11 illustrates a magnetic recording medium (a hard disk) 200 mounted on a spindle motor (not illustrated), a pivot-rotating actuator arm 13, a magnetic head 12, two crush stops 17 and 18, and a voice coil motor 14.

The actuator arm 13 is driven by exciting the voice coil motor 14, thereby moving the magnetic head 12 in a radial direction. While the magnetic recording medium 200 is rotated and the magnetic head 12 is moved from the outer circumference to the inner circumference of the magnetic recording medium 200 in a constant speed, a reference servo signal is recorded in a spiral track 100, as shown in FIG. 11. The spiral track 100 having the recorded reference servo signal includes embedded timing information (for example, by missing bit). Thus, a specified number of spiral tracks 100 are recorded on the magnetic recording medium 200.

The positioning process using the spiral reference signal is performed on the following basis. FIG. 12 illustrates an output waveform when the magnetic head 12 crosses over one spiral track 100 in a process of signal read-back on the same single circle on the magnetic recording medium 200 having spiral tracks 100 written thereon while floating the magnetic head 12.

As shown in FIG. 12, the read-back waveform has an overall configuration of a leaf and contains periodic timing signals 101. With radial movement of the magnetic head 12, the timing signal 101 does not shift, and the peak position 102 of the read-back signal shifts. An angular position of the magnetic recording medium 200 is detected by the timing signal 101, and an amount of movement in the radial direction of the magnetic head 12 can be known by the shift of the peak position 102 of the read-back waveform. The position information is used for positioning the magnetic head 12.

When a reference servo signal is recorded by an off-line servo writing process, for example, based on the above-described method and the magnetic recording medium is installed in an HDD to execute self servo writing, an accurate servo signal is obtained with reduced device costs.

In the above-described method, however, it takes extraordinarily long time to write the reference servo signal, producing a problem of high costs due to low productivity. In order to cope with this problem, a method has been proposed in which servo information is recorded altogether on a magnetic recording medium by a magnetic transfer technology using a master disk carrying the servo information instead of writing the servo information using a magnetic head. Japanese Unexamined Patent Application Publication No. 2002-083421, for example, discloses a method of transferring servo information to a perpendicular magnetic recording medium using a master disk carrying the servo information in a servo pattern formed of a ferromagnetic material.

FIG. 13 illustrates a principle of magnetic transfer called an edge transfer process to a perpendicular magnetic recording medium.

Referring to FIG. 13, a master disk 300 for magnetic transfer is provided with a pattern 305 of protrusions and recesses of a ferromagnetic material, preferably a soft magnetic material. A medium 200 to be transferred is made in close contact with the master disk 300 and an external magnetic field 406 is applied by magnets 400 generating a leakage magnetic flux 407 which penetrates into the medium 200. A magnetic recording layer 208 of the medium 200 is magnetized as indicated by the reference numeral 209, transferring a magnetic signal according to the pattern 305 of the master disk 300.

The magnets 400 are arranged above and below the master disk 300 and the medium 200 to be transferred. The upper and lower magnets are rotated together transferring entire information at once, as shown in FIG. 13.

Another method of magnetic transfer called a bit transfer process is also known as shown in FIGS. 14(a) and 14(b). Describing more in detail, a first magnetic field is applied in an approximately perpendicular direction to the surface of the medium 200 to be transferred by a magnet 400 as shown in FIG. 14(a), to magnetize the medium 200 to be transferred in one direction (an initialization step).

Then as shown in FIG. 14(b), a master disk 300 is made in close contact with the medium 200 to be transferred, and a magnetic field 406 in a direction opposite to the first magnetic field (that has been applied in the initialization step) is applied by a magnet 400. In this second magnetic field application, magnetic field hardly passes through recessed parts of the ferromagnetic pattern 305 formed on the master disk 300, leaving the magnetization in the direction of the first magnetic field. At protruding parts of the ferromagnetic pattern 305, a large amount of magnetic flux passes through the medium 200 magnetizing the medium in the direction of this second magnetic field as indicated by the reference numeral 209. As a result, a magnetization pattern is transferred according to the pattern of protrusions and recesses, that is the ferromagnetic pattern 305 formed on the surface of the master disk 300 (a transferring step).

A method of manufacturing a master disk 300 is disclosed in Japanese Patent No. 3999436 and Japanese Patent No. 3343343, for example.

Japanese Patent No. 3999436 discloses a method of manufacturing a master disk for magnetic transfer as follows. A disk having photoresist applied thereon is irradiated with an electron beam while rotating, to draw a pattern on the photoresist corresponding to the information to be transferred. After a development process, a pattern of protrusions and recesses is formed to obtain an original disk. After that, nickel electroforming is conducted on the original disk to produce a metal mould, which is then peeled off to obtain a metal disk of nickel. Then, a soft magnetic film is deposited on the pattern of protrusions and recesses on the metal disk to manufacture a master disk for magnetic transfer.

Japanese Patent No. 3343343 discloses a method of manufacturing a master disk for magnetic transfer as follows. A photoresist is applied on a nonmagnetic substrate. The photoresist is patterned corresponding to the information to be transferred by a lithographic method exposing to an electron beam followed by a development process. Subsequently, a configuration of protrusions and recesses corresponding to the information to be transferred is formed on the nonmagnetic substrate by means of a dry etching method or the like. Then, a ferromagnetic thin film is deposited by a sputtering method or the like. After that, the resist film and the excessive ferromagnetic thin film formed on the resist film are removed by a lift-off method, to manufacture a master disk for magnetic transfer with a structure having ferromagnetic thin films embedded at the recessed parts.

In the method of manufacturing a master disk for magnetic transfer, as described above, a pattern is formed using an electron beam lithography apparatus to draw the pattern while rotating the substrate. This electron beam lithography is generally executed while rotating the substrate, thereby scanning the electron beam along concentric circles, and switching the electron beam irradiation ON/OFF (ON/OFF drawing).

Meanwhile, the reference servo signal in the spiral mode as described previously is recorded while moving the actuator arm, resulting in a shape as shown in FIG. 15. Each dot 2 of the pattern written on the spiral track 100 by the magnetic head has a shape of approximately parallelogram in which the side A is tilted with a certain angle with respect to the circumferential direction of the concentric circles. Here, the word "approximately" shows the following meaning. The data tracks are not straight lines. Hence, the sides extending along the circumferential direction have slight curvature deviating from the parallelogram shape. Also, "a shape of approximately parallelogram" includes slightly deformed shape of parallelogram, such as slightly nonparallel sides. In addition, a shape of parallelogram includes a rectangular shape.

Such a figure is difficult to be drawn by the drawing scheme of scanning the electron beam on a concentric circle while switching the electron beam irradiation ON/OFF. Even in the case of drawing an analogous shape, the scanning pitch must be very fine, producing a problem of increased drawing time.

SUMMARY OF THE INVENTION

In view of the above issues, it is an object of the present invention to provide a method of drawing a pattern for magnetic transfer using an electron beam, the pattern corresponding to a reference servo signal in a spiral mode that is recorded by a magnetic head.

In order to accomplish the above object, a method of drawing a pattern for magnetic transfer according to the present invention draws a pattern by rotating a substrate to be drawn to scan an electron beam in a circumferential direction, wherein the pattern is a dot pattern arranged in a spiral configuration corresponding to a reference servo signal in a spiral mode to specify a radial position of a concentric track; the pattern is drawn by switching irradiation with the electron beam ON/OFF while applying a deflection signal having a periodic saw-toothed waveform in the radial direction; a magnitude of the largest deflection according to the deflection signal having a saw-toothed waveform is $Tp/n$ [nm] in a condition of drawing one track with a track pitch $Tp$ [nm] in n times of scanning processes; and a period of the saw-toothed waveform of the deflection signal is $(2\pi B)/(nA)$ [radian], in which A is a number of bits in one round in the circumferential direction of the pattern, and B is a number of bits on a spiral trajectory while a position of the drawing dot shifts in the radial direction by one track in the drawing process on the spiral trajectory.

Preferably, a period T [s] of the saw-toothed waveform is $(2\pi BR)/(nAL)$ [s], in which L [mm/s] is a linear velocity in the drawing process that is conducted in a constant linear velocity, and R [mm] is a radial position in the drawing process.

The present invention allows a pattern corresponding to a reference servo signal in a spiral mode to be drawn with ease and in a short time by switching an electron beam ON/OFF while applying deflection signals.

DETAILED DESCRIPTION OF THE INVENTION

Figure 1:
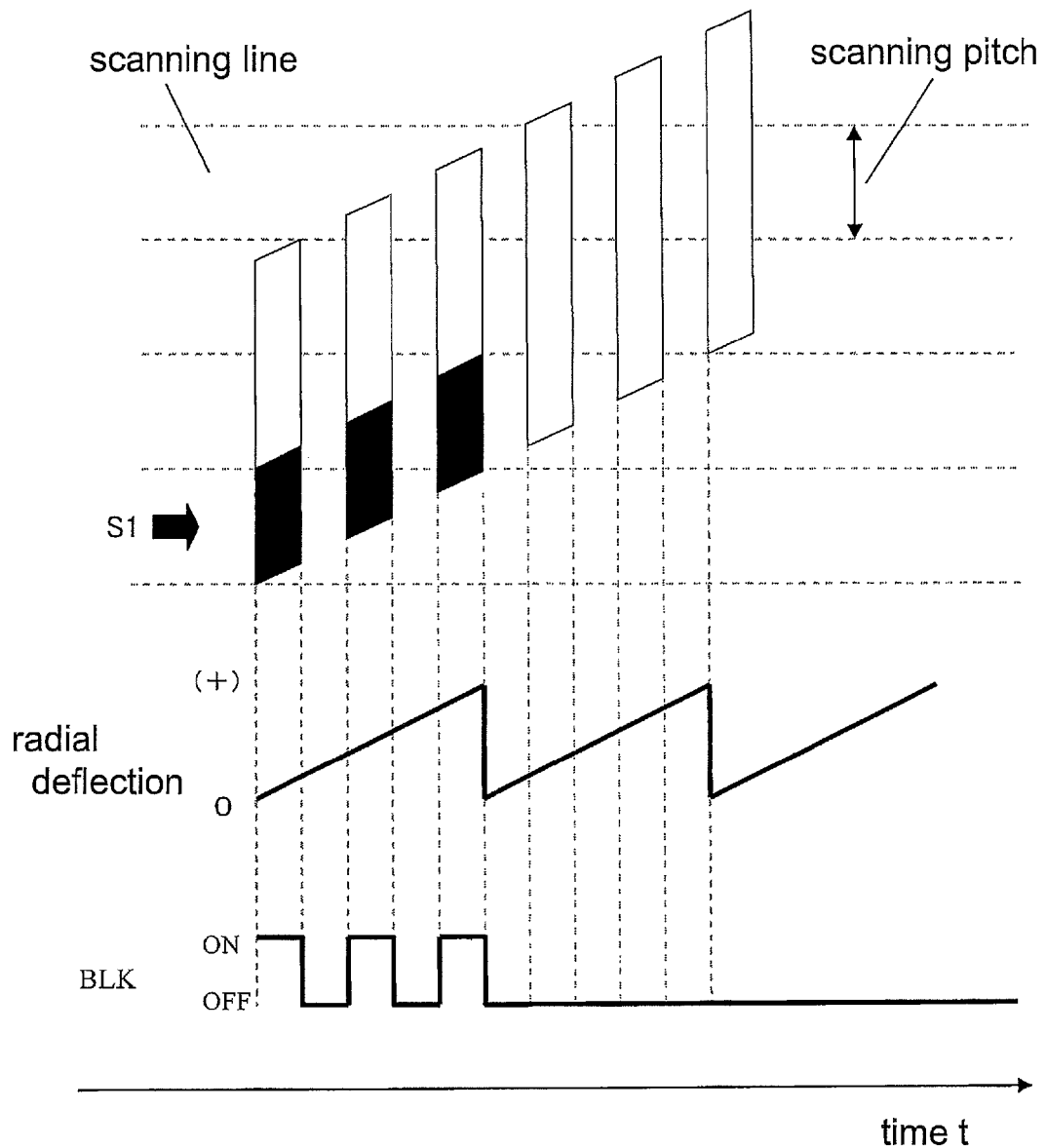
FIG. 1 is a timing chart showing a relationship between a blanking signal and a deflection signal for an electron beam and a drawing pattern, in the state when the scanning line 51 is scanned in an aspect of embodiment of the present invention.

Now, an aspect of embodiment according to the present invention will be described with reference to the accompanying drawings. In the drawings, the same or equivalent parts are given the same symbol and description thereon is omitted.

The following describes an arrangement of a dot pattern, which is a reference servo pattern corresponding to a reference servo signal in a spiral mode.

First, a description is made concerning a tilting angle of the spiral configuration with reference to a specific example.

The reference servo signal of this specific example comprises a timing bit of "1100" and burst signals including 22 times of "10" signals repeated until the next timing bit recorded on a spiral track. The timing bit and the burst signal are repeatedly recorded on the spiral track with a set of 48 bits in total.

Figure 9:
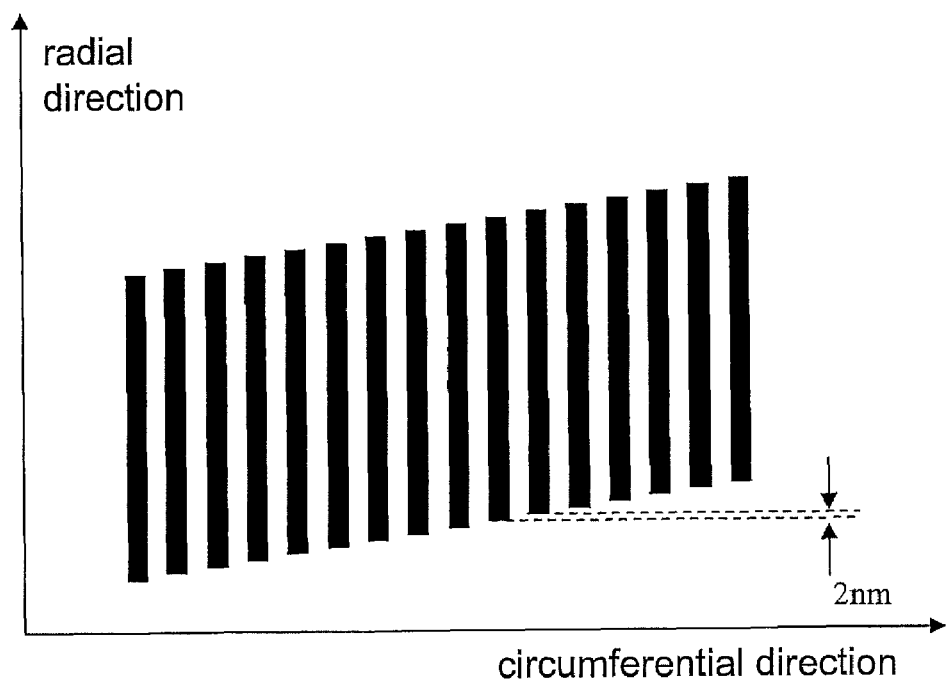
FIG. 9 shows an arrangement of a reference servo pattern drawn in a comparative example indicating a scanning pitch.

Now, the number of bits around one circle on the disk is supposed to be 103,680. When a tilting angle of the spiral is such an angle that a half width of the concentric track matches to a distance from a timing bit to the next timing bit (with assumption of one concentric track width of 96 nm), an arrangement of 48 bits creates a shift of 48 nm in radial direction. If the drawing bits are shifted uniformly in the radial direction, a shift of 2 nm in the radial direction is needed for the every bit in this arrangement, as shown in FIG. 9.

For drawing this arrangement by an ON/OFF drawing, a scanning pitch in the drawing process must be at most 2 nm and drawing of one concentric track (96 nm) needs 48 times of scanning processes, which requires impractically long time.

Accordingly, the scanning pitch is taken rather roughly, for example, one track is drawn by ten times or less scanning processes. When the radial shift of the drawing dots is smaller than the scanning pitch, the drawing is conducted by the electron beam with necessary radial deflection.

Figure 2:
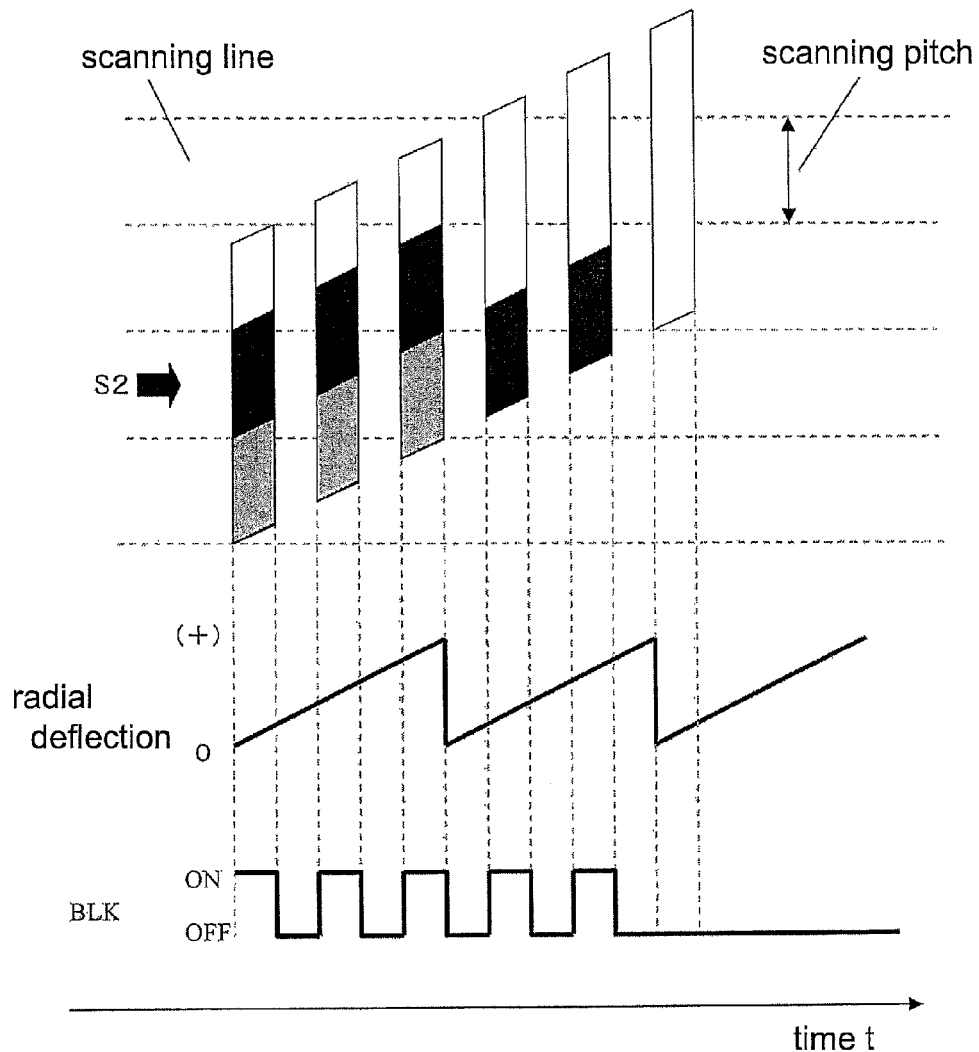
FIG. 2 is a timing chart showing a relationship between a blanking signal and a deflection signal for an electron beam and a drawing pattern, in the state when the scanning line S2 is scanned in an aspect of embodiment of the present invention.

Further description will be made with reference to FIGS. 1 and 2. The upper part of each of FIG. 1 and FIG. 2 shows a spiral pattern to be drawn and a scanning pitch, and the lower part shows a deflection signal for deflecting the electron beam in the radial direction and a blanking signal BLK for controlling blanking operation to switch the electron beam irradiation ON/OFF. The electron beam is shot in the period of ON.

FIG. 1 shows a state when the scanning line S1 is drawn. As shown in FIG. 1, the electron beam is shot at places to be drawn by switching the blanking signal BLK ON while periodically deflecting the electron beam in the radial direction.

Figure 3:
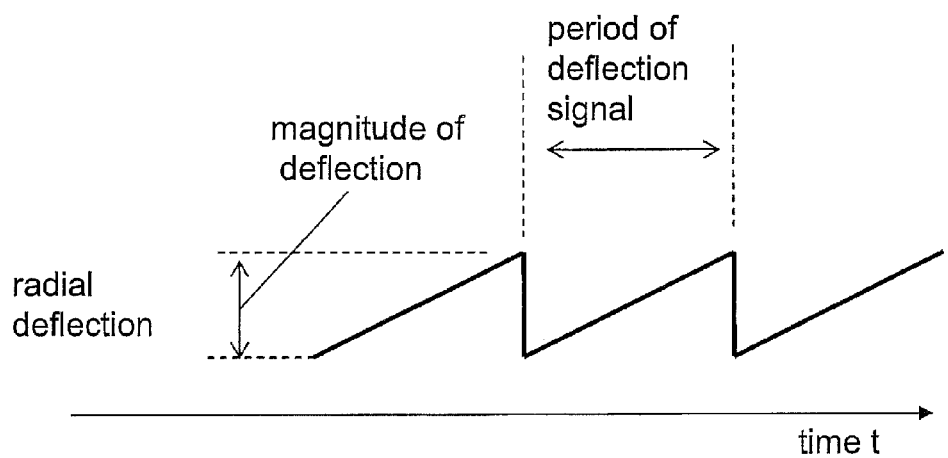
FIG. 3 is a timing chart showing a deflection signal for an electron beam in an aspect of embodiment of the present invention.

The deflection signal has a periodical saw-toothed waveform as shown in FIG. 3. A magnitude of largest deflection is a quantity of the scanning pitch, which is represented by Tp/n in a drawing condition of n rounds of scanning for a concentric track pitch Tp [nm].

As shown in FIG. 1, the scanning process of the scanning line S1 draws the three dots from the left in the figure on the scanning line S1 (the places filled with black). As can be seen in the figure, the drawing is conducted deviating from the scanning line S1 corresponding to the deflection of the electron beam.

FIG. 2 shows a state when the scanning line S2 is drawn. The deflection signal is the same, but the blanking operation is changed from the one in FIG. 1, resulting in drawing at the places filled with black. (The gray places are the parts that have been drawn by the scanning of S1.)

Thus, a row of dots in a spiral configuration can be drawn by using a radial deflection signal with a periodical saw-toothed waveform and switching the electron beam irradiation ON at the places to be drawn on the scanning line.

Figure 4:
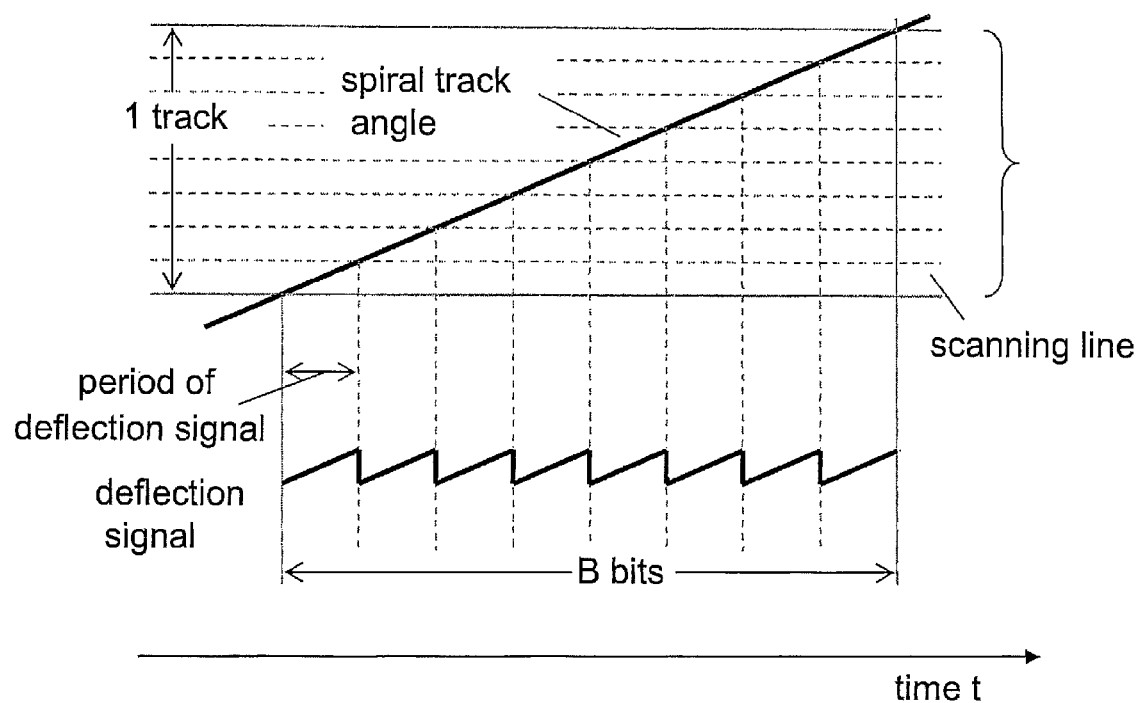
FIG. 4 is a timing chart showing a relationship between a deflection signal for an electron beam and, a concentric track and a spiral track in an aspect of embodiment of the present invention.

Now consideration is given to a period of the deflection signal. FIG. 4 shows a concentric track, scanning lines, a tilting angle of a spiral track, and a radial deflection signal.

Let the number of bits of a pattern to be drawn be A for one round of the disk, the number of bits on the spiral trajectory be B while the position of the drawing dots shifts by a radial distance of one track, and the number of scanning processes necessary for scanning one track be n. A period of the deflection signal of the saw-toothed waveform equals B/n bits, which can be represented in radian as $(2\pi B)/(nA)$ [radian]. For drawing at a constant linear velocity of L [mm/s], a period T [s] of the saw-toothed waveform is $(2\pi BR)/(nAL)$ [s], in which R [mm] is a radial position of the scanning line.

EXAMPLE

A more specific example of the aspect of embodiment of the present invention is described below. A comparative example is described as well.

Example 1

A pattern of a reference servo pattern in a spiral mode is drawn. The pattern comprises a timing bit of "1100" and burst bits of "10"×22 cycles, and 103,680 bits in one round of the disk. A shift of a half track corresponds to the bits from a timing bit to the next timing bit. A width of one track is 96 nm.

The drawing is conducted in a condition of 8 times of scanning for one track, which is equivalent to a scanning pitch of 12 nm. Linear velocity of substrate rotation is 400 mm/s in the drawing process. A range of drawing is from a radial position of 14 mm to 30 mm of the disk to be drawn.

Figure 5A:
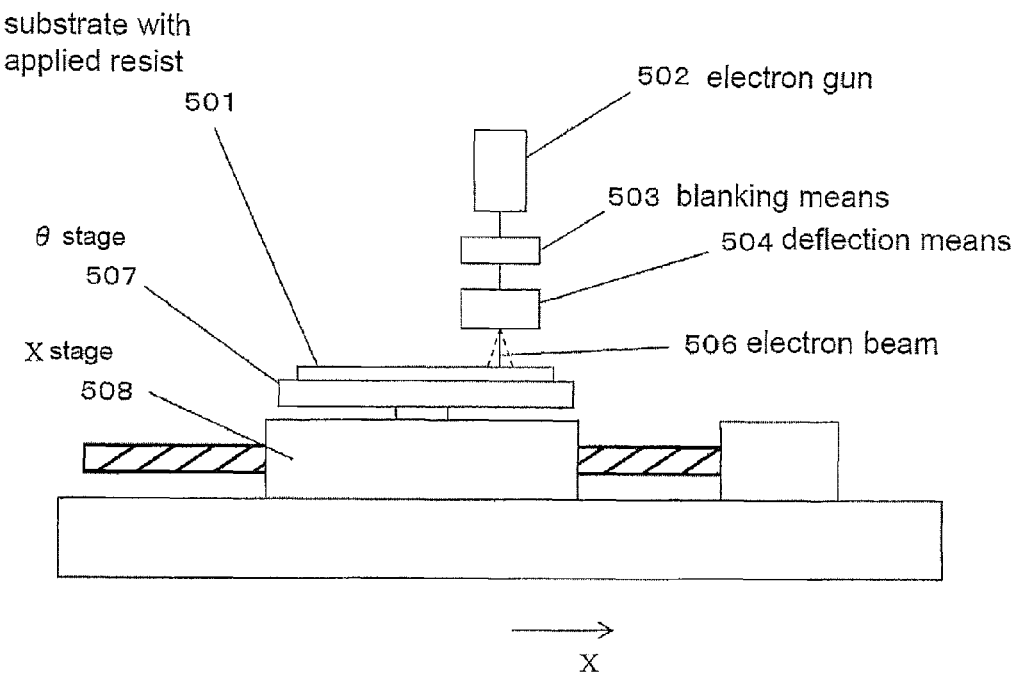
FIGS. 5(*a*) and 5(*b*) show a construction of an electron beam lithography apparatus used in an aspect of embodiment of the present invention, in which FIG. 5(*a*) is a side view and FIG. 5(*b*) is a top plan view.
Figure 5B:
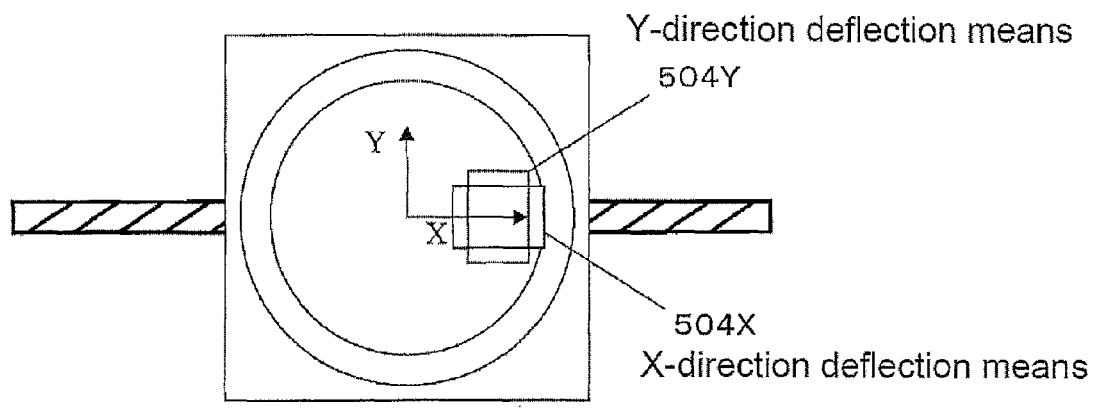

FIGS. 5(*a*) and 5(*b*) show an outline construction of an electron beam lithography apparatus. Drawing process is conducted by determining a radial position by the X stage 508 and rotating the θ stage 507 to scan the electron beam 506 along the circumferential direction. The electron beam is deflected by giving deflection signals to an X direction deflecting means 504X and a Y direction deflecting means 504Y of a deflection means 504. Blanking operation is conducted by inputting a blanking signal to the blanking means 503.

Figure 6:
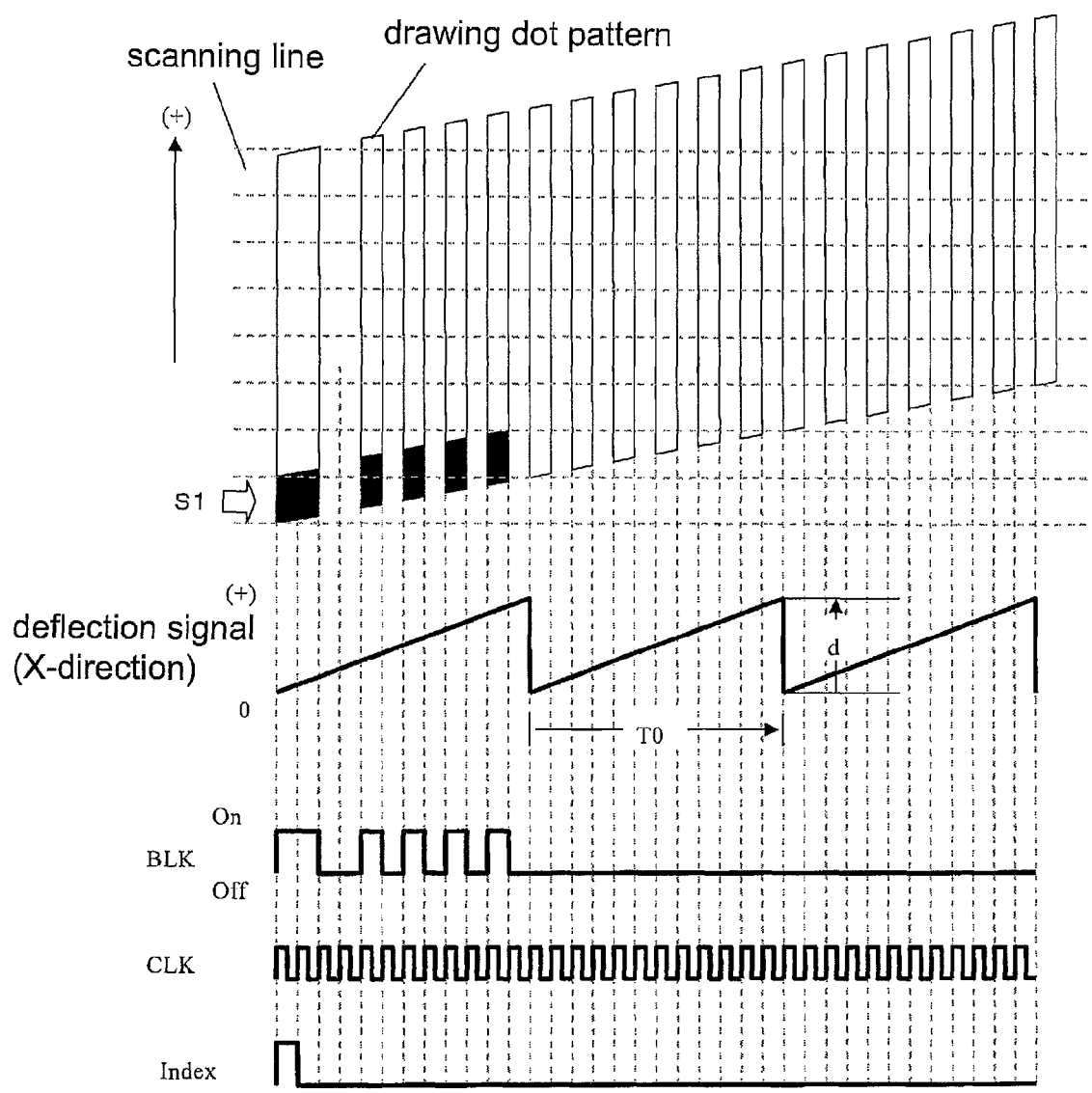
FIG. 6 is a timing chart showing a relationship between a blanking signal and a deflection signal for an electron beam and a drawing pattern, in the state when the scanning line S1 is scanned in an embodiment example of the present invention.

FIG. 6 shows the deflection signal and the blanking operation in the process of drawing the pattern described above. The pattern drawn according to the signals is also illustrated.

First, a work, which is a disk substrate 501 having a resist film applied thereon, is moved by the X stage 508 to a position for scanning the S1 scanning line in FIG. 6. The θ stage 507 is rotating at a rotating speed equivalent to a linear velocity of 400 mm/s on the scanning line.

As for deflection signals, FIG. 6 shows only a deflection signal in the X direction, and a deflection in the Y direction, which is not conducted, is not shown in the figure. The deflection signal in X-direction is periodical with respect to the rotation angle of θ stage 507 with a period of $(2\pi \times 96)/(8 \times 103{,}680)=0.000727$ [radian]. Representing in a time span, $T0=0.000727 \times R$ [mm]/400 [mm/s]=$1.81805 \times R$ [msec], where R is a radial position of the scanning line. The maximum deflection d in X-direction is 96 [nm]/8=12 [nm].

When a scanning operation is conducted on the scanning line S1 in this condition giving the deflection signal and the blanking signal BLK as shown in FIG. 6, drawing is performed on the parts filled with black of the dot pattern shown in upper region of FIG. 6.

The deflection signal and the blanking signal are outputted on the basis of an index signal Index and synchronizing with a clock signal CLK having a period of a bit.

In this way, a drawing procedure is conducted on the part of the scanning line S1 overlapping with the spiral track until finish of one round of the disk.

Figure 7:
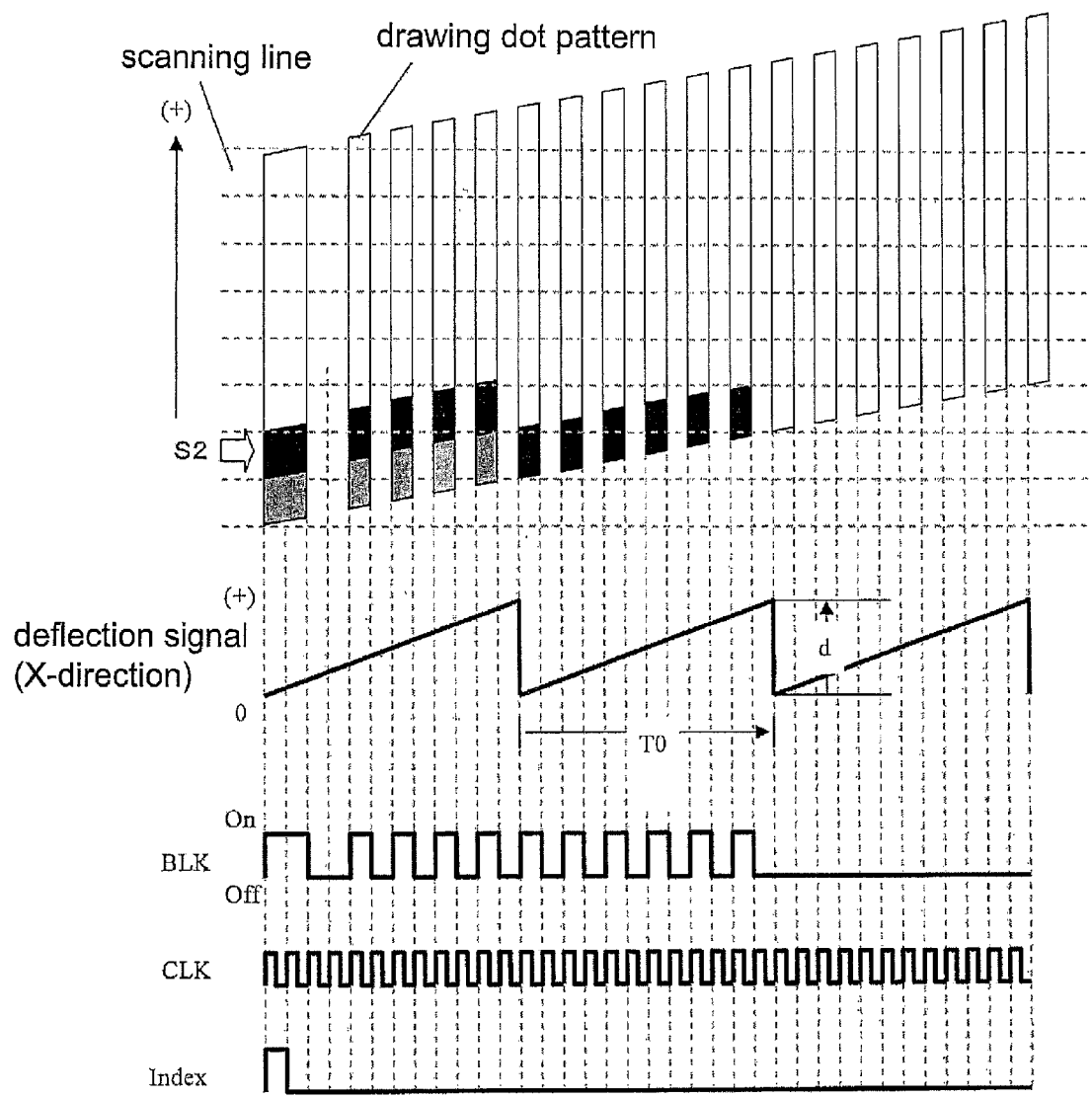
FIG. 7 is a timing chart showing a relationship between a blanking signal and a deflection signal for an electron beam and a drawing pattern, in the state when the scanning line S2 is scanned in an embodiment example of the present invention.

After the drawing procedure on the scanning line S1 in one round of the disk, a drawing process moves to the next scanning line S2 as shown in FIG. 7. In FIG. 7, the parts that have been drawn on the scanning line S1 is depicted with gray, and the parts drawn anew on the scanning line S2 is depicted with black. The black parts are drawn using the deflection signal and the blanking signal shown in FIG. 7.

The number of revolution of the θ stage 507 is such a number of revolutions that results in a linear velocity of 400 mm/s on the scanning line.

A pattern in an overall configuration of a spiral is drawn by scanning all the scanning lines in the drawing area repeating the above-described procedure.

Figure 8:
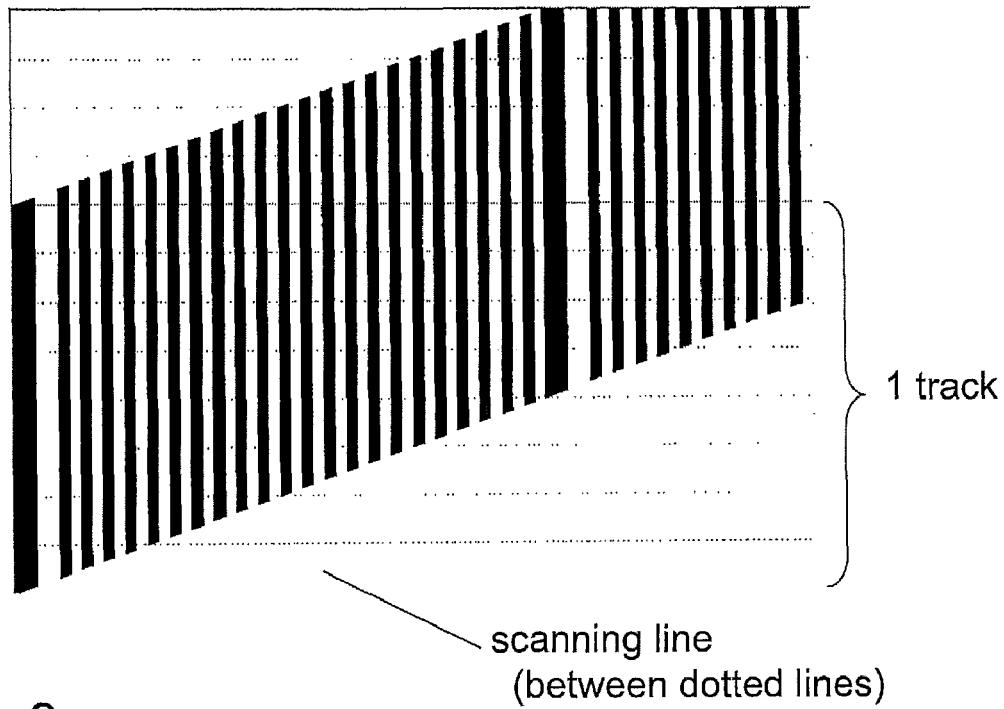
FIG. 8 shows an arrangement of a reference servo pattern drawn in an embodiment example of the invention.

FIG. 8 shows a pattern drawn by the above-described procedure. A dot pattern in tilted arrangement is drawn by 8 times of scanning in one track. A drawing time in this example is 128 hrs.

Comparative Example 1

A pattern of Comparative Example 1, the pattern being similar to the one in Example 1, is drawn not using deflection of an electron beam as in the present invention but employing a method in which a substrate is rotated to scan an electron beam in the circumferential direction and irradiation with the electron beam is switched ON/OFF by a blanking operation.

This method of Comparative Example 1 is unable to draw a tilted line. Thus, the drawing proceeds as shown in FIG. 9 in an arrangement where each drawing dot shifts in the radial direction along a spiral trajectory.

The drawing pattern comprises a timing bit of "1100" and burst bits of "10"×22 cycles, and 103,680 bits in one round of the disk. The pattern shifts a half track from a timing bit to the next timing bit. Since a width of one track is 96 nm, the pattern shifts 48 nm in the radial direction for 48 bits.

For drawing a part corresponding to the bit "1", a shift in the radial direction of the adjacent drawing bits is 2 nm as shown in FIG. 9. Thus, a scanning pitch in the radial direction is set to be 2 nm.

The range of the drawing pattern was from a radial position of 14 mm to 30 mm as in Example 1 and the linear velocity of substrate rotation was 400 mm/s in the drawing process.

Figure 10:
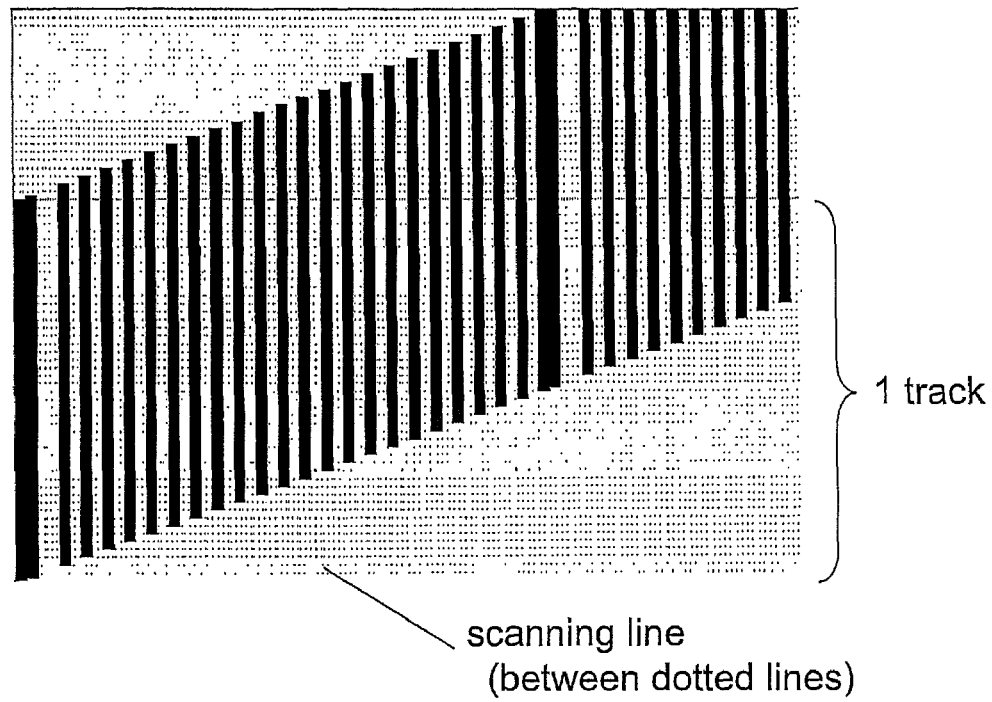
FIG. 10 shows an arrangement of a reference servo pattern drawn in a comparative example.
Figure 11:
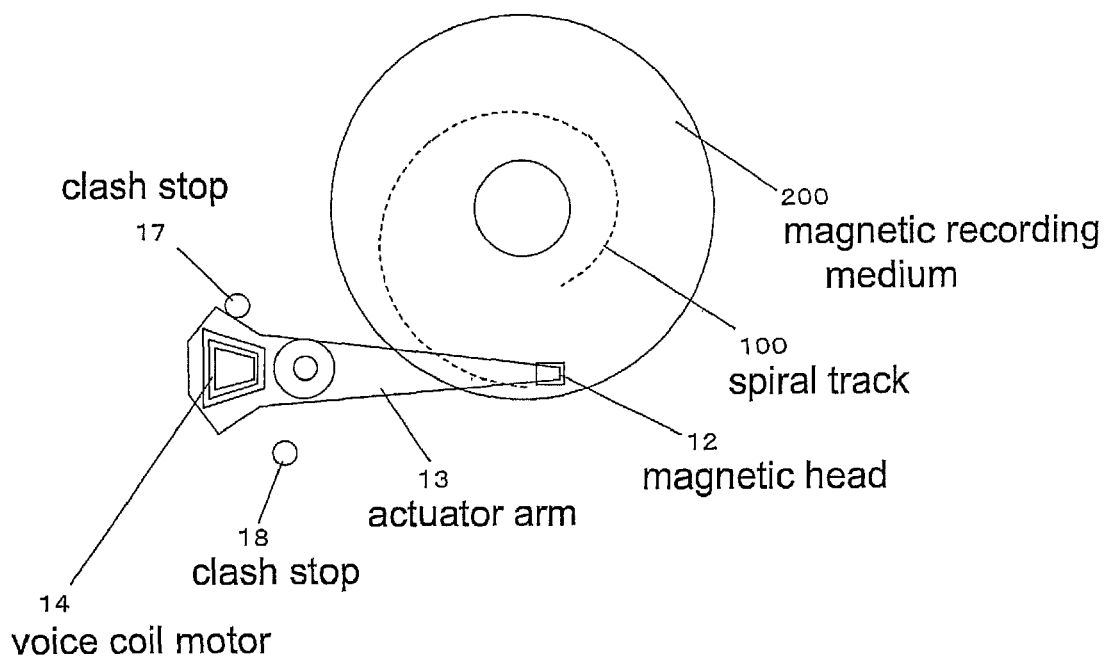
FIG. 11 shows a construction of a conventional device for recording a pattern corresponding to a reference servo signal in a spiral mode using a magnetic head.
Figure 12:
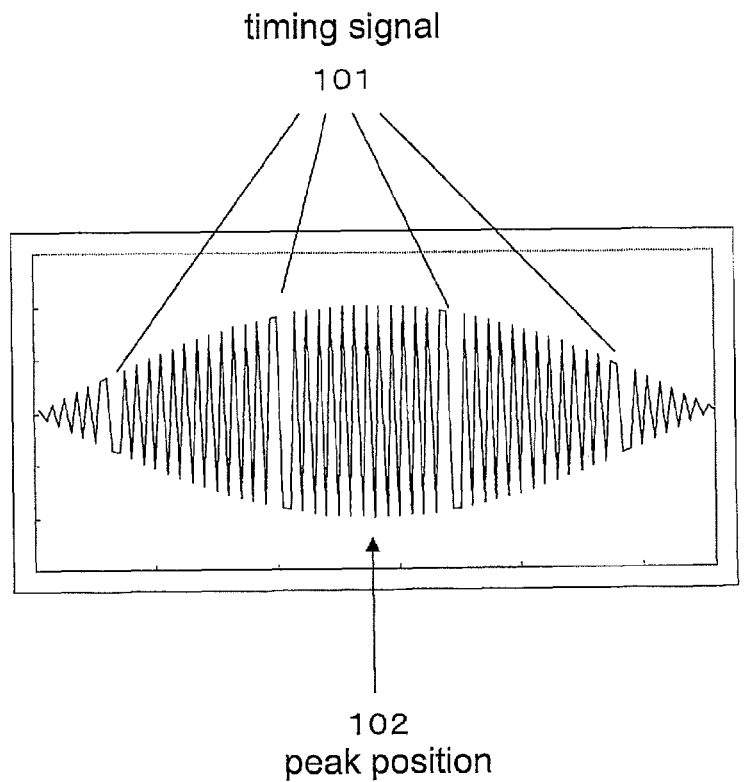
FIG. 12 is a read-back waveform of the reference servo signal in a spiral mode in a conventional system.
Figure 13:
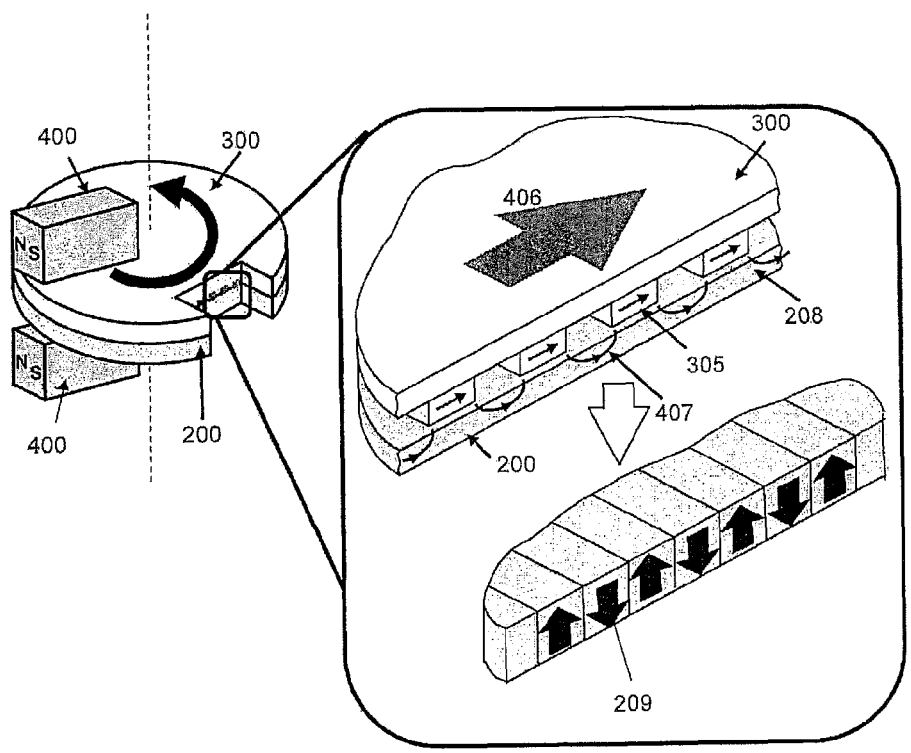
FIG. 13 is a perspective view with an essential part cut and enlarged illustrating a principle of a magnetic transfer method, an edge transfer method, for a medium to be transferred of perpendicular magnetic recording medium.
Figure 14A:
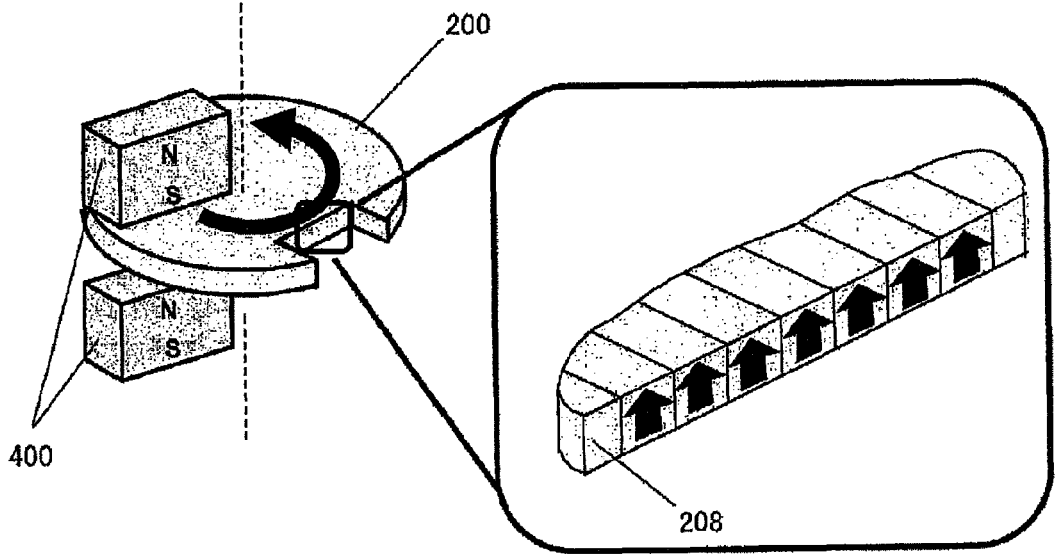
FIGS. 14(*a*) and 14(*b*) are perspective views with an essential part cut and enlarged illustrating a principle of another magnetic transfer method, a bit transfer method, for a medium to be transferred of perpendicular magnetic recording medium.
Figure 14B:
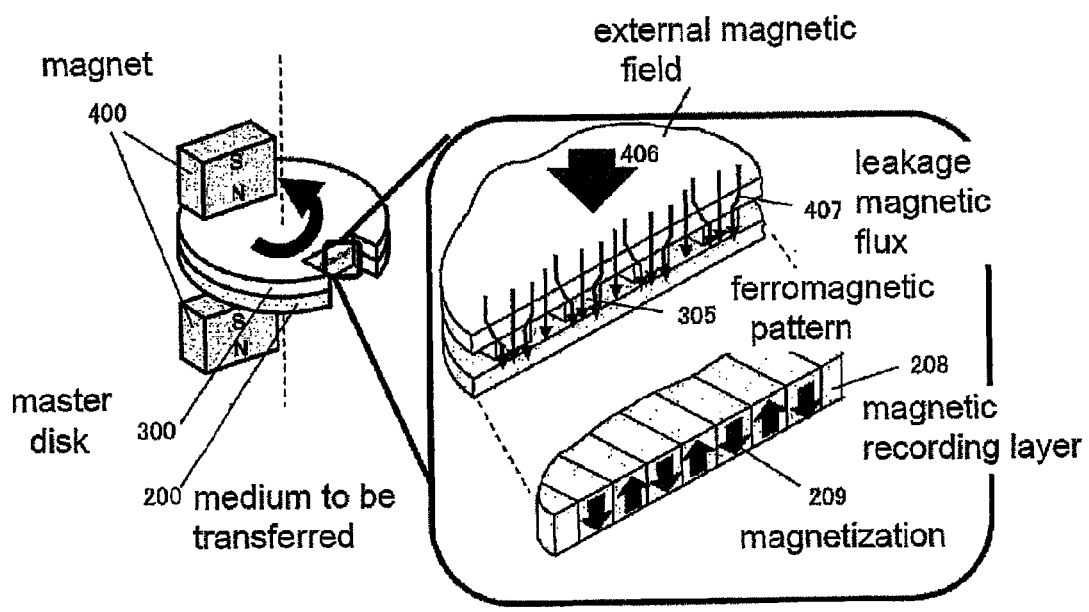
Figure 15:
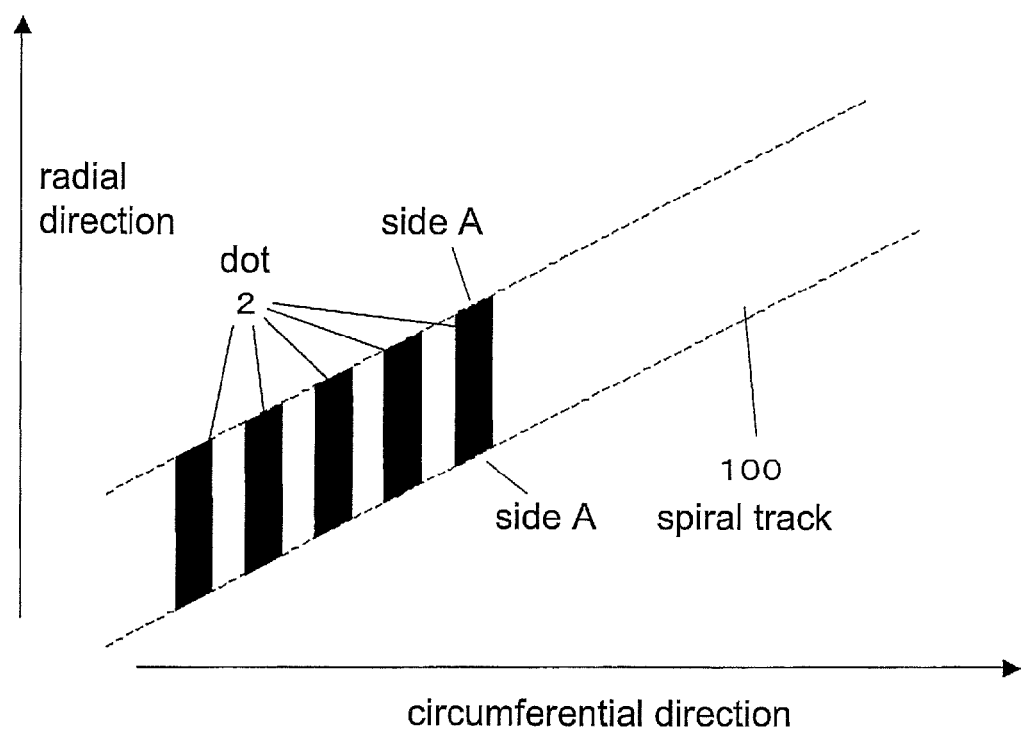
FIG. 15 shows arrangement of dots in a pattern corresponding to a reference servo signal in a spiral mode in a conventional system.

A pattern drawn in this method with this condition results in the pattern shown in FIG. 10. It takes 768 hrs for drawing the pattern.

Comparing Example 1 and Comparative Example 1, the pattern drawn in Comparative Example 1 has a stepwise configuration, and further it takes much longer time in Comparative Example 1.

What is claimed is:

1. A method of drawing a pattern for magnetic transfer on a substrate, comprising:
    rotating the substrate, and scanning the substrate, by an electron beam, in a circumferential direction thereof; and
    deflecting, using a deflection signal, the electron beam in a radial direction thereof, and switching irradiation of the electron beam on and off, so as to create the pattern of a plurality of dots,
    wherein the deflection signal is of a periodic saw-toothed waveform, and
    if the method draws one track of the substrate by repeating the scanning n times, the deflection signal has a period of $(2\pi B)/(nA)$, where A is a number of bits of the pattern in one round in the circumferential direction, and B is a number of bits of the pattern on a spiral trajectory when the spiral trajectory shifts by one track in the radial direction.

2. The method of claim 1, wherein, if the method draws one track of the substrate with a track pitch Tp by repeating the scanning n times, the deflection signal has a maximum magnitude of Tp/n.

3. A method of drawing a pattern for magnetic transfer on a substrate, comprising:
    rotating the substrate, and scanning the substrate, by an electron beam, in a circumferential direction thereof; and
    deflecting, using a deflection signal, the electron beam in a radial direction thereof, and switching irradiation of the electron beam on and off, so as to create the pattern of a plurality of dots,
    wherein the deflection signal is of a periodic saw-toothed waveform, and
    the deflection signal has a period of $(2\pi BR)/(nAL)$, where L is a constant linear velocity of the drawing, and R is a radial position of the scanning.

4. The method of claim 1, wherein the pattern of the plurality of dots are arranged in a spiral configuration, corresponding to a reference servo signal in a spiral mode, to specify a radial position of a concentric track of the substrate.

5. The method of claim 3, wherein, if the method draws one track of the substrate with a track pitch Tp by repeating the scanning n times, the deflection signal has a maximum magnitude of Tp/n.

6. The method of claim 3, wherein the pattern of the plurality of dots are arranged in a spiral configuration, corresponding to a reference servo signal in a spiral mode, to specify a radial position of a concentric track of the substrate.

* * * * *